June 5, 1928.
J. DERRY
1,671,980
TAPE APPLYING MECHANISM
Filed Feb. 1, 1926   3 Sheets-Sheet 2
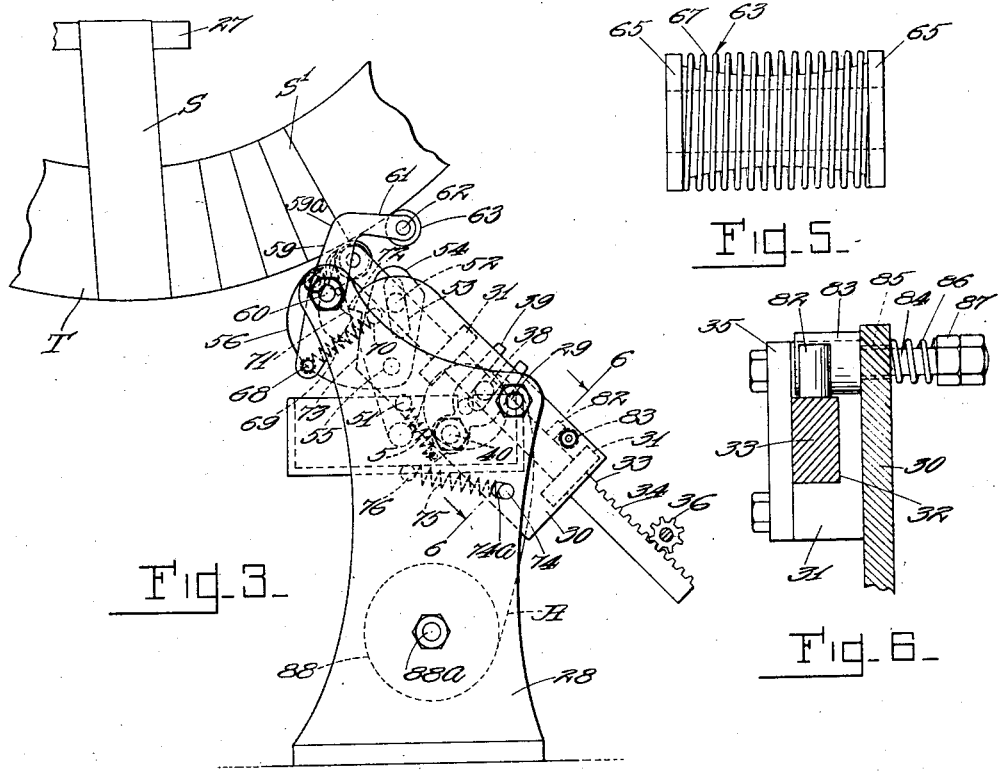
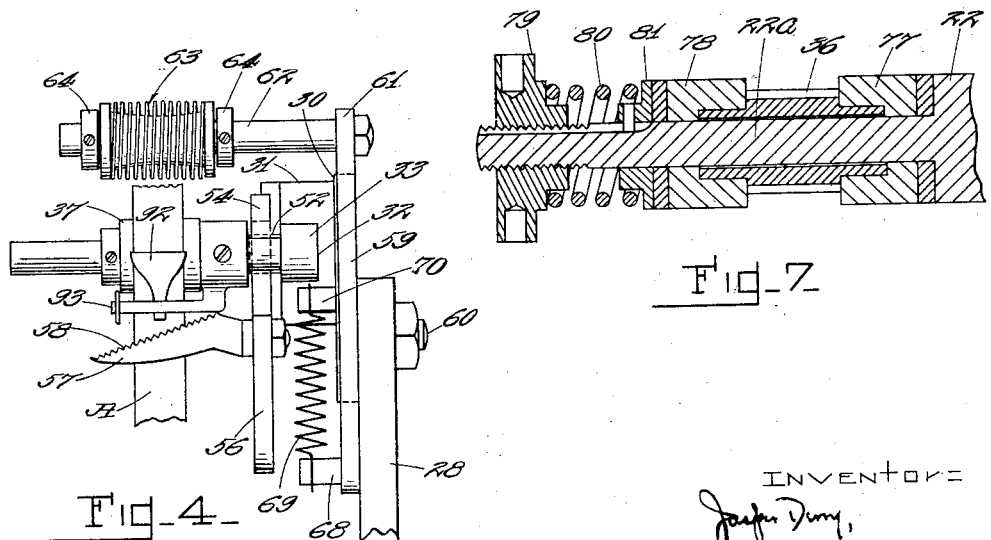
INVENTOR
Jasper Derry,
by MacLeod, Calver, Copeland & Dike,
Attys.

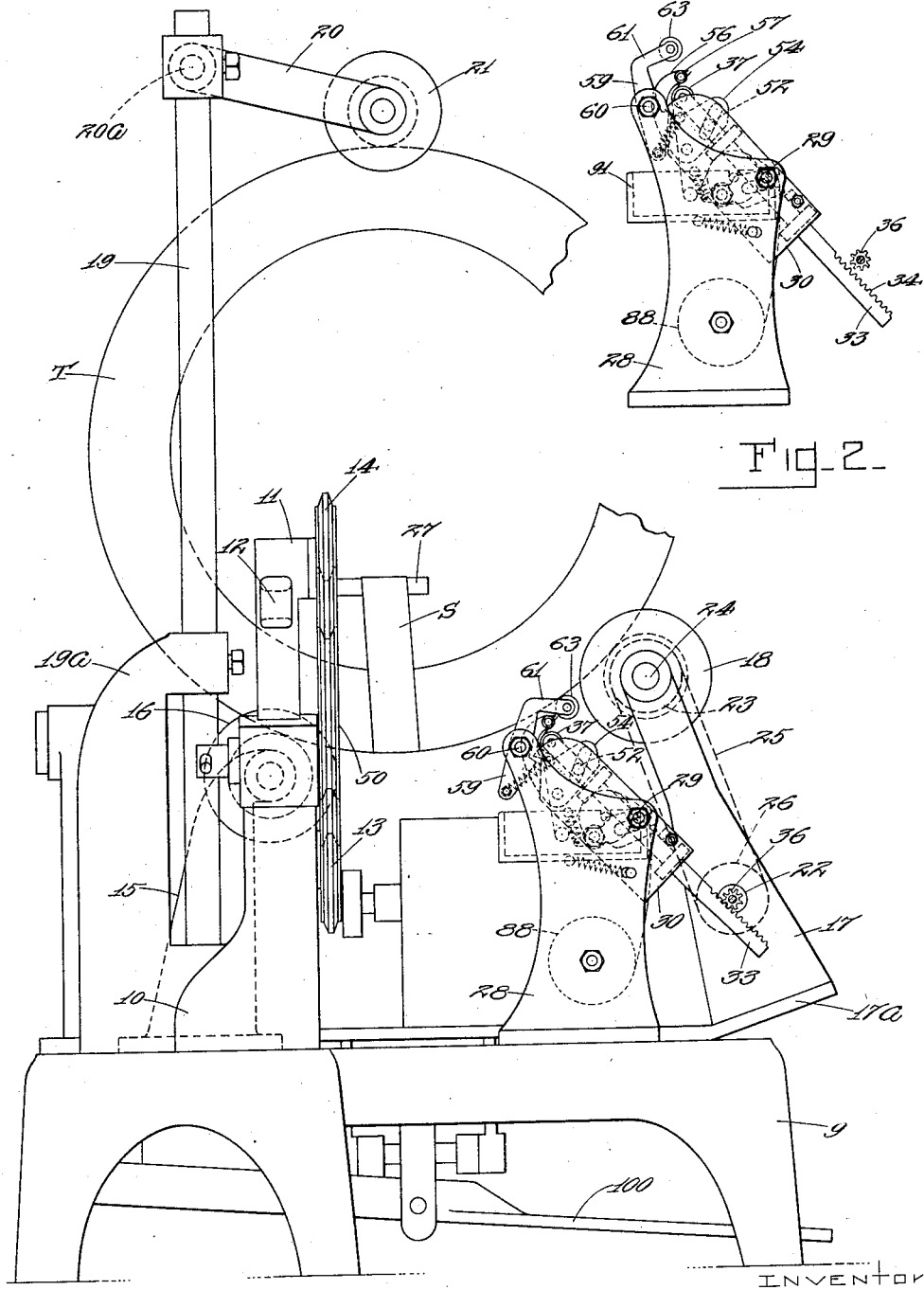

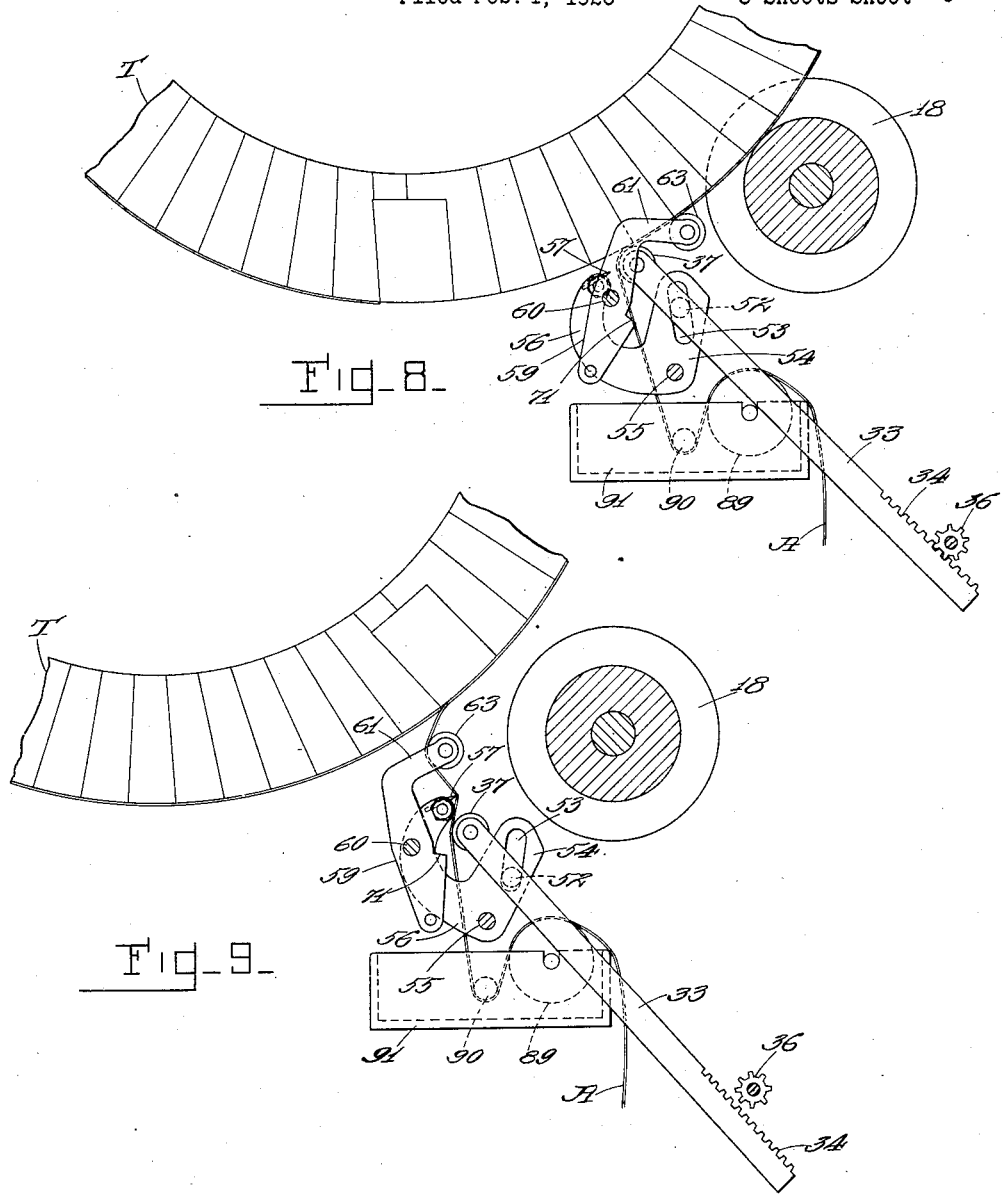

Patented June 5, 1928.

1,671,980

UNITED STATES PATENT OFFICE.

JASPER DERRY, OF MEDFORD, MASSACHUSETTS, ASSIGNOR TO ANDREW TERKELSEN, OF BOSTON, MASSACHUSETTS.

TAPE-APPLYING MECHANISM.

Application filed February 1, 1926. Serial No. 85,182.

The invention relates in general to wrapping machines and more particularly to a mechanism for applying an adhesive tape to the article or object, such as a tire, after it has been wrapped. In the present machine mechanism is provided for applying helical windings of a wrapping strip around the object or tire, and the tape applying mechanism of this invention, forming a part of the machine, operates to apply an adhesive tape around the periphery of the tire while it is being wrapped.

One of the objects of the invention is to provide an improved wrapping machine particularly adapted for wrapping annular articles such as tires, wherein the adhesive tape or strip is fed from the tape applying mechanism by the rotation of the tire while being wrapped, and wherein this mechanism is so timed that the tape will commence to be applied at the proper point upon the wrapping strip when the initial windings thereof reach the tape applying position.

A further object of the invention is to provide an improved wrapping machine comprising tape applying mechanism which is automatically controlled by the placing of the tire to be wrapped in the machine and by the removal of the tire completely wrapped. In accordance with the present invention when the tire is placed in the machine, the tape applying mechanism is automatically connected or clutched with the driving means for the wrapping mechanism, so that when the tape applying means is advanced toward the tire it is timed so as to commence applying the tape at the time when the initial windings of wrapping material reach the tape applying position. In addition the various mechanisms are so organized that the removal of the tire after being wrapped and taped automatically disconnects the tape mechanism from the wrapping machine and thereupon the tape is automatically severed.

A further object of the invention is to provide a tape applying device adapted to be reciprocated toward and from the tire and wherein a severing device for the tape is controlled for shiftable movement into and out of cutting position by the tape applying device. Furthermore the present improved machine comprises a tape pressing device controlled by the tire or object wrapped and having provision for controlling the reciprocation of the tape applying device. As a result of the improved construction, the tape applying device is shifted into operative position by the driving means for the wrapping mechanism which operation is controlled through the medium of the tire when positioned in the machine, and the means for retracting the tape applying device and for operating the severing device is also controlled through the medium of the tire upon removing it from the machine. Thus the entire operation of the tape applying device as well as the severing device is controlled by the position of the tire in the machine and the removal of the tire from the machine.

Other objects of this invention will appear in the following description and appended claims, reference being had to the accompanying drawings forming a part of this specification, wherein like reference characters designate corresponding parts in the several views, and wherein:

Fig. 1 is a front elevation of a machine constructed in accordance with my invention and illustrating the tape applying mechanism at the commencement of the wrapping operation.

Fig. 2 is a detail view of the tape applying mechanism with the parts in normal position.

Fig. 3 is a fragmentary side elevation showing the tape applying mechanism with the parts in position at the commencement of the tape applying operation.

Fig. 4 is a front elevation, partly broken away, of the tape applying mechanism.

Fig. 5 is a detail view of the tape pressing roll.

Fig. 6 is a sectional view taken substantially on lines 6—6, Fig. 3 in the direction of the arrows.

Fig. 7 is a sectional view showing the pinion drive for the tape applying device.

Fig. 8 is a detail view, partly in section, showing the tape applying mechanism near the completion of the operation thereof, some of the mechanism being omitted for the sake of clearness.

Fig. 9 is a similar view showing the operation of the mechanism when the tire is removed from the machine.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation. Thus the term "tire" has been herein selected for use in the description and claims for the sake of convenience and is intended to be construed broadly as any article, especially annular objects, which are to be wrapped and taped.

In the drawings, I have illustrated a present preferred form of my invention and, as shown in Fig. 1, the machine comprises a suitable base 9 upon which is mounted a standard or support 10. A swinging yoke 11 is pivotally supported at one end thereof (not shown) and at its opposite end is adjustably connected to the standard 10, the yoke 11 carrying a handle 12 by means of which the yoke may be manipulated. A further detail description of this construction is not deemed necessary herein since the parts may be constructed as in the machine shown and described in my application for Letters Patent filed August 22, 1923, Serial No. 658,767. Rotatably mounted upon a stud extending from the yoke 11 is a guide roller or disk 13 and at the upper end of the yoke is similarly mounted a roller 14. A rotary shuttle 50 is supported on the rollers 13 and 14 and may be driven by friction disks (not shown) at the opposite side of the machine as in my above mentioned application. From the foregoing construction, it will be seen that the shuttle 50 may be adjusted so as to centre it with respect to the tire by adjusting the position of the supporting yoke 11.

Rising from the base 9 is a standard 15 carrying at its upper end a roller 16, and at the other side of the base is mounted a standard 17 carrying at its upper end a roller 18. The tire or other object to be wrapped is supported upon the rollers 16 and 18 and is also guided by means of an upper weighted roller 21 carried by a swinging arm 20 which is pivoted at 20$^a$ to an upright or post 19, the latter being supported in a bracket 19$^a$ extending from the bed of the machine.

The rollers 16 and 18 are rotated by means of suitable driving connections so as to rotate the tire at a constant speed. Any suitable driving connections may be provided for rotating the rollers and the construction may be substantially the same as described in another application for Letters Patent filed February 1, 1926, Serial No. 85,183. As shown in Fig. 1, the roller 18 is operated from a driven shaft 22 carrying a sprocket 26, the latter being connected by means of a chain 25 to a suitable sprocket 23 on the shaft 24 which carries the driving roller 18. The opposite roller 16 may be driven from the shaft 22 by means of suitable chain and sprocket mechanism which have been omitted from Fig. 1 for the sake of clearness in the showing of other mechanism.

The wrapping material is preferably in the form of a continuous strip S of paper which is fed from a roll (not shown) carried by the shuttle 50, as in the above applications, and this strip S passes over a stud or guide 27 carried by the shuttle and thence conducted to the tire T or other object to be wrapped.

As in the above mentioned application the stud or guide 27 is horizontally inclined to cause the axis of the guide to extend at an oblique angle to the axis of the shuttle, and as a result of this construction uniform strain will be placed on the opposite edges of the strip S irrespective of the different inclinations in which the strip is led off to different size tires.

It will be seen that the supporting roller 18 is located higher than the roller 16 and at a relatively greater distance at one side of the vertical line passing through the centre of the tire T. As in the above mentioned application, Serial No. 85,183, the supporting rollers 16 and 18 support the different size tires or other annular articles without requiring any adjustment for the purpose of causing the opposite edges of the inclined strip S to engage the tire uniformly and with equal pressure or strain on such edges. This equalization of the strain on the edges of the strip prevents breaking or tearing of the strip while being wrapped on the tire. Thus it will be noted that the supporting rolls 16 and 18 are fixed or at constant points, requiring no adjusting, and that the line of centres of the rolls is vertically inclined, one roll being supported at a constant higher point than the other.

The tape applying mechanism in the present invention is carried by an upright or pedestal 28 mounted on the bed of the machine, and as shown in Fig. 1 a base is mounted adjacent thereto which is provided with an angular and upwardly inclined extension 17$^a$, and upon this extension is mounted in inclined position the supporting post 17 for the roll 18. This construction facilitates the positioning of the roll 18 in close proximity to the tape applying mechanism.

Pivoted at 29 to the upper end of the support 28, see particularly Fig. 3, is a swinging guide plate or lever 30 provided at one face thereof with guide members 31 forming a lengthwise extending guideway 32 within which is guided for reciprocation a tape applying member 33. This member 33 is in the form of a reciprocating plunger or rod and is provided at one end thereof with rack teeth 34 formed on the upper edge of the member. As shown in Fig. 6, the tape applying member 33 is held within the guideway 32 by means of plates 35 bolted to the face of the guide 31. Adapted to mesh with the rack teeth 34 is a pinion 36 as a result of which the tape applying plunger 33 may be shifted relatively to the tire or article to be wrapped. Mounted on the upper end of the rod 33 is a tape applying roll 37 by means of which the tape which is guided to the roll is applied to the periphery of the tire.

The rod or plunger 33 carries a stud 38 which is located within a slot formed in a fork lever 39 fulcrumed at 40 to the swinging plate 30. Connected to the inner end of the fork lever 39 is a tension spring 5 which is connected to a stud 51 carried by the swinging plate 30.

Adjacent to the upper end of the rod or plunger 33 is mounted a stud 52 which is housed within a cam slot 53 formed in one end of an elbow or bell crank lever 54 pivoted at 55 to the plate 30. The other arm 56 of the lever 54 carries at its free end a cutter or knife 57 preferably provided at the cutting edge thereof with saw teeth 58, see Fig. 4.

At the upper end of the support 28 is pivoted at 60 a swinging presser roll lever 59. As shown at 59ª this lever overlaps the side of the tire when in position and the upper end of the lever is bent rearwardly to provide an angular arm 61 carrying at its free end a laterally extending stud 62 (see Fig. 4) upon which is mounted a tape presser roll 63. This roll is adjustably mounted upon the stud 62 by means of adjustable collars 64, as shown particularly in Fig. 4. The tape presser roll 63, see Fig. 5, comprises a central core or body portion which is grooved or concave in form terminating at opposite ends in flanges 65. Surrounding the body portion or core of the roll is a spiral spring 67 which is retained in position between the flanged ends 65 of the roll. From this construction it will be seen that the central portion of the roll when pressed against the periphery of the tire will yield to conform to the curvature of the tire. In addition the rotation of the roll caused by frictional engagement with the rotatable tire will cause the spiral spring 67 to firmly engage the tape from edge to edge thereof and press it down smoothly over the wrappings S with substantially a worm or screw action.

The swinging presser roll lever 59 is provided at its lower end with a stud 68 to which is connected a tension spring 69, the opposite end of the spring being connected to a stud 70 on the swinging plate 30. As shown especially in Fig. 3, the inner edge of the lever 59 is formed or cut away to provide a shoulder or tooth 71 and the adjacent edge of the swinging plate 30 is cut away at 73 to provide a mating tooth or projection 72. Adjacent to the lower end of the plate 30 is a stud 74, which is mounted on the plate at one side and below the fulcrum 29, and connected to this stud is a tension spring 75 which is connected at its opposite end to a stud 76 carried by the upright or support 28. This stud is housed in an arcuate slot 74ˣ in the pedestal 28 forming a stop for limiting the swinging movement of plate 30 about its pivot 29.

Referring particularly to Fig. 7 it will be noted that the driving pinion 36 for operating the rack teeth 34 of the tape pressing member 33 is mounted upon a reduced end 22ª of the driven shaft 22. This pinion is frictionally held between a pair of counterbored collars 77 and 78. At the free end of the reduced portion 22ª is threaded an operating disk 79 between which and a collar 81 keyed on the shaft portion is located a compression spring 80. From this construction it will be seen that the pinion 36 by virtue of the action of spring 80 is frictionally driven from the shaft 22.

Referring particularly to Fig. 6 the rack member 33 is provided with a projecting stop 82 in position to engage, upon retracting the rack or plunger, a roll 83 extending from the face of the plate 30. The roll 83 is carried by a stud 84 extending through an elongated slot 85 formed in the plate 30. Mounted on the stud 84 is a spring 86 which is housed between the outer face of the plate 30 and a pair of lock nuts 87. From this construction it will be seen that when the rack 33 is retracted or withdrawn from the tire the stop 82 will engage the roll 83 thereby limiting the rearward movement of the rack or plunger, and this action is cushioned by means of the spring 86.

The adhesive tape in the present instance is carried by a tape roll 88 supported by a stud 88ª carried by the support 28. The tape is drawn from the roll 88 in a continuous strip A and passes upwardly over guide rolls 89 and 90 through a moistening chamber or reservoir 91. Thence the strip A is guided upwardly to the tape applying roll 37, and is held in position against the roll by means of a spring presser member 92 carried by an arm 93 secured to the underside of the plunger 33 as shown in Fig. 4.

The operation of the mechanism is as follows:

When the tire T is placed in the machine upon the rolls 16 and 18, the periphery of the tire will engage the tape presser roll 63 forcing it downwardly and thereby swinging the opposite end of the lever 59 and placing tension upon the spring 69. This action will cause the tooth or projection 71 to move away from the tooth 72, and the action of spring 69 will swing the plate 30 to cause the lower end of the bar 33 to swing into engagement with the pinion 36. As will be understood from the construction the teeth 34 are normally out of mesh with the pinion 36, and when the lever 59 is swung, upon placing the tire in the machine into engagement with the roll 63, the tension of spring 69 will overcome the tension of spring 75, thereby imparting to plate 30 a slight swinging movement sufficient to bring the rack teeth 34 into operative engagement with pinion 36.

It will be seen that the tape applying roll 37 is spaced circumferentially of the tire from the shuttle 50 and hence the tape applying position is spaced from the wrapping position. When the machine is started by operating the treadle 100 through suitable connections, the shaft 22 will be rotated constantly in one direction and at the same time the rolls 16 and 18 will be rotated and also the shuttle 50.

As the tire commences to rotate and the initial winding of the strip S is applied thereto by means of the rotary shuttle 50, the pinion 36 meshing with the rack teeth 34 commences to move the rack bar 33 and tape applying roll 37 toward the tire. The adhesive tape A is held against the roll 37 by means of the spring tension member 92 (Fig. 4), and the mechanism is timed so that roll 37 will reach the tire coincident with the arrival of the initial winding S' (Fig. 3) at the tape applying position. Thus it will be seen that the time required for the initial winding S' to travel with the tire from wrapping position to taping position is the same as the time required for the roll 37 to travel from the position shown in Fig. 1 or Fig. 2 to the position in Fig. 3.

When the tape applying roll 37 engages the periphery of the tire under predetermined pressure the forward movement of rack bar 33 is stopped, overcoming the friction drive of pinion 36, and hence the roll 37 is pressed and held against the tire with constant pressure.

It will be understood that as the tire is rotated and wrapped with spiral windings of strip S, the adhesive tape will be drawn from the tape supporting roll 88 through the chamber or reservoir 91 and continuously applied around the periphery of the tire by means of the roll 37. It will be further seen that the tape presser roll 63 will be forced under spring pressure against tape, thereby pressing the tape firmly and smoothly against the several wrappings S. When the tire is completely wrapped and reaches the position shown in Fig. 8, the machine is stopped, and the tire is given a slight turn so as to bring the end of the wrappings into tape applying position so that the adhesive tape will be applied entirely around the periphery of the tire, as shown in Fig. 9. Thereupon the tire is lifted from the supporting rollers 16 and 18, see Fig. 9, and the removal of the tire releases the spring pressed roll 63 permitting the tension spring 69 to swing the lever 59. This action causes the tooth 71 to engage the tooth or projection 72 of the swinging plate 30. As the tension of spring 69 is thus released the spring 75 will act to swing the plate 30 and thereby swing the lower end of the rack bar 33 away from the pinion 36. This results in disconnecting the rack from the driving pinion, and thereupon the fork lever 39 acting against stud 38 will force the bar 33 away from the tire, the movement of lever 39 being caused by the action of spring 5. As the bar or member 33, which carries the tape roller 37, is retracted from the tire the stud 52 will travel downwardly in the cam slot 53 and swing the knife or cutter 57 upwardly so as to sever the tape, as shown in Fig. 9. It will be noted that the severing device or knife 57 acts to sever the tape between the tape applying roll 37 and the tape pressing roller 63, so that the free end of the tape remains held in position against the roll 37 by the tension device 92. This facilitates successive operations of the machine on various tires. It will be understood from the foregoing that when the bar 33, carrying the tape applying roller 37, is moved toward the tire into tape applying position, the action of stud 52 in cam slot 53 will swing the knife 57 downwardly away from the tape as shown in Fig. 8.

It will also be noted that the inclination of the support 17 toward the taping mechanism brings the roll 18 close to the tape applying position. Since tires of various diameters, when supported on the rolls 16 and 18, engage these rolls at common points of intersection of the peripheries thereof, the tape roll 37 and tape pressing roll 63 will be relatively close to these constant points of support for the different size tires. Furthermore the position of rolls 37 and 63 in close proximity to the supporting roll 18 for the tire permits the taping mechanism to be readily used in connection with tires of different diameters or sizes. Due to the constant points of support of the tires of different sizes by rolls 16 and 18, and due to the fact that tires are rotated at constant speed in definite ratio to the speed of rotation of shaft 22, the timing of the movement of presser roll 37 into engagement with the initial winding S' of the wrapping strip when it reaches tape applying position will be automatic for the different size tires.

It is to be understood that by describing in detail herein any particular form, structure, or arrangement, it is not intended to limit the invention beyond the terms of the several claims or the requirements of the prior art.

What I claim is:

1. The combination of wrapping means for applying windings of a strip to a tire, tape applying means spaced therefrom circumferentially of the tire, means for rotating the tire, and means automatically timed for operating said tape applying means to apply tape when the initial windings of the wrapping strip reach the tape applying position.

2. The combination of means for wrapping a tire, means for rotating the tire, a tape applying device movable toward and from the tire, and means for timing the movement of said device into taping position to correspond to the travel of the tire from wrapping position to taping position.

3. The combination of mechanism for applying a wrapping material to a tire, means spaced therefrom for applying an adhesive tape to the tire whereby the wrapping position is spaced from the taping position, mechanism for rotating the tire, and means controlled thereby and timed to move the tape applying means into operative position after a predetermined number of windings of wrapping material have been applied to the tire.

4. In a machine having means for applying a wrapping material to a tire, the combination of an adhesive tape applying device, and mechanism in position to be controlled by the tire for shifting said device into and out of tape applying position.

5. In a machine having means for applying a wrapping material to a tire, the combination of an adhesive tape applying device, and reciprocating mechanism in position to be operated by the tire for controlling the reciprocation of said device into and out of tape applying position.

6. In a tire wrapping machine, the combination of a tape applying device shiftable into and out of tape applying position, a tape severing device, and mechanism in position to be operated by the tire for controlling the operation of said devices.

7. In a tire wrapping machine, the combination of a tape applying device, a tape severing device, and means controlled for operation by the tire for shifting said severing device into and out of cutting position with relation to the tape.

8. In a machine having means for applying a wrapping material to a tire, the combination of an adhesive tape applying device, and a yielding tape pressing device in position to be engaged by the tire for controlling the movement of said tape applying device into and out of tape applying position.

9. In a tire wrapping machine, the combination of a tape applying device shiftable into and out of tape applying position, a tape severing device, and a yielding tape pressing device in position to be engaged by the tire for controlling the operation of said devices.

10. In a machine of the class described, the combination of a tape applying device movable toward and from the tire, means for guiding the tape thereto, means for moving said tape applying device, and a cutter controlled by the movement of said device for movement toward and from the tape.

11. In a machine of the class described, the combination of a tape applying device movable toward and from the tire, means for guiding the tape thereto, means for moving said tape applying device, a cutter controlled by said device for movement toward and from the tape, and a tape presser roll in position to be engaged by the tire for controlling the operation of said device and cutter.

12. In a machine of the class described, the combination of a taping device movable toward and from the tire, operating means for shifting the device, means for connecting and disconnecting said operating means and device, and means in position to be engaged by the tire and operable when the tire is placed in the machine for operating said second means to connect the taping device with its operating means.

13. In a machine of the class described, the combination of a taping device movable toward and from the tire, operating means for shifting the device, means for connecting and disconnecting said operating means and device, and a yielding tape pressing roll in position to be engaged by the tire for operating said second means to connect the taping device with its operating means.

14. In a machine of the class described, the combination of a taping device movable toward and from the tire, operating means for shifting the device, means for connecting and disconnecting said operating means and device, means for guiding the tape to said device, and a tape cutter operated by said taping device for movement relatively to the tape.

15. In a machine of the class described, the combination with mechanism for rotatably supporting a tire, of a reciprocating taping device, mechanism for shifting said device relatively to the tire, a swinging tape cutter, and cam means for swinging said cutter from the taping device.

16. In a machine of the class described, the combination with mechanism for rotatably supporting a tire, of a reciprocating taping device, mechanism including a rack and pinion for shifting said device relatively to the tire, a swinging tape cutter, and cam means for swinging said cutter from the taping device.

17. In a machine of the class described, the combination with mechanism for rotatably supporting a tire, of a rotary shaft, a reciprocating taping device, spring means for shifting the device in one direction relatively to the tire, operating means driven from said shaft for shifting the taping device in the opposite direction, and means for disconnecting said operating means from the taping device.

18. In a machine of the class described, the combination of a rotary shaft, a reciprocating taping device, spring means for shifting the device in one direction relatively to the tire, operating means driven from said shaft for shifting the taping device in the opposite the direction, and means for disconnecting said operating means from the taping device and comprising a yielding device in position to be engaged by the tire.

19. In a machine of the class described, the combination of a rotary shaft, a reciprocating taping device, spring means for shifting the device in one direction relatively to the tire, operating means driven from said shaft for shifting the taping device in the opposite direction, and means for disconnecting said operating means from the taping device and including a swinging tape pressing roll spring connected to said taping device.

20. In a machine of the class described, the combination of a reciprocating taping device, mechanism including a rack and pinion for shifting said device relatively to the tire, a swinging tape cutter, cam means for swinging said cutter from the taping device, and a yielding tape pressing roll engaged by the tire for connecting and disconnecting said rack and pinion.

21. The combination of a tape applying device, and a tape pressing device comprising a spool carrying a spiral spring yieldable to conform to the shape of a tire.

22. The combination of a tape applying device and a tape pressing device comprising a roll having a central grooved core, a spiral spring surrounding said core and adapted to yield transversely to the longitudinal axis of the roll to conform to a curved surface.

23. In a machine of the class described, the combination of a swingingly supported tape applying device, operating means for shifting said device relatively to the tire, and mechanism for swinging said device relatively to said operating means to connect and disconnect the same.

24. In a machine of the class described, the combination of a swingingly supported tape applying device, means for guiding tape to said device, and a movable tape cutter shiftable into and out of cutting position by said device.

25. In a machine of the class described, the combination of a swingingly supported tape applying device, operating means for shifting said device relatively to the tire, and mechanism for swinging said device relatively to said operating means to connect and disconnect the same, and comprising a movable tape pressing roll engaged by the tire and having a yielding connection with said tape applying device.

26. In a machine of the class described, the combination of a reciprocating member having at one end a tape applying roll, rack teeth carried by said member, a driven pinion cooperating with said teeth, supporting means for swingingly supporting said member and having a guideway to permit reciprocation of said member therein, and means for swinging said supporting means to disconnect said teeth and pinion at predetermined times.

27. In a machine of the class described, the combination of a reciprocating member having at one end a tape applying roll, rack teeth carried by said member, a driven pinion cooperating with said teeth, supporting means for swingingly supporting said member and having a guideway to permit reciprocation of said member therein, and means in position to be engaged by the tire and connected to said supporting means for swinging the same to connect said teeth and pinion when the tire is placed in tape applying position.

28. In a machine of the class described, the combination of a tape applying member, a rack and pinion for shifting the same into engagement with the tire, means for operating said pinion, and means for permitting disconnection of the pinion and its operating means when said tape applying member engages the tire.

29. In a machine of the class described, the combination with mechanism for rotatably supporting a tire, of a sliding member having a tape applying roll at one end thereof, rack teeth carried thereby, and a driven pinion meshing with said teeth for shifting the roll against the tire.

30. In a machine of the class described, the combination of a sliding member having a tape applying roll at one end thereof, rack teeth carried thereby, a driven pinion meshing with said teeth for shifting the roll against the tire, and means for automatically holding said pinion in mesh with the rack and free from rotation.

31. The combination of means for applying spiral windings of a strip around a tire, means for supporting different size tires at fixed points, a tape applying device movable toward and from the tire and in constant relation to said points, and means for timing the movement of said device into taping position to correspond with the travel of the tire from wrapping position to taping position.

In testimony whereof I affix my signature.

JASPER DERRY.